(12) United States Patent
LeCostaouec

(10) Patent No.: US 11,578,774 B2
(45) Date of Patent: Feb. 14, 2023

(54) METHOD OF MANUFACTURING CMC COMPONENTS USING BORON CARBIDE

(71) Applicant: GOODRICH CORPORATION, Charlotte, NC (US)

(72) Inventor: Jean-Francois LeCostaouec, Simsbury, CT (US)

(73) Assignee: Goodrich Coroporation, Charlotte, NC (US)

( * ) Notice: Subject to any disclaimer, the term of this patent is extended or adjusted under 35 U.S.C. 154(b) by 650 days.

(21) Appl. No.: 16/672,817

(22) Filed: Nov. 4, 2019

(65) Prior Publication Data

US 2021/0131514 A1    May 6, 2021

(51) Int. Cl.
| | | |
|---|---|---|
| *F16D 69/02* | (2006.01) | |
| *B28B 11/24* | (2006.01) | |
| *C04B 35/628* | (2006.01) | |
| *C04B 35/64* | (2006.01) | |

(52) U.S. Cl.
CPC .......... *F16D 69/023* (2013.01); *B28B 11/243* (2013.01); *C04B 35/6286* (2013.01); *C04B 35/62873* (2013.01); *C04B 35/64* (2013.01); *C04B 2235/422* (2013.01); *C04B 2235/5248* (2013.01); *C04B 2235/5252* (2013.01); *C04B 2235/616* (2013.01); *C04B 2235/656* (2013.01); *C04B 2235/661* (2013.01); *F16D 2200/0052* (2013.01); *F16D 2200/0065* (2013.01); *F16D 2200/0091* (2013.01)

(58) Field of Classification Search
CPC ... Y10T 428/249928; F16D 2200/0047; F16D 69/023; B23B 18/00; B28B 11/243; C04B 35/573; C04B 35/62625; C04B 35/6286; C04B 2235/3821; C04B 2235/5436; C04B 2235/786; C04B 2235/616; C04B 2235/3813; C04B 2235/5252
USPC ...... 427/376.2; 501/87, 95.2, 91; 408/293.4; 264/678; 428/293.4
See application file for complete search history.

(56) References Cited

U.S. PATENT DOCUMENTS

| | | | |
|---|---|---|---|
| 6,855,428 | B2 | 2/2005 | Lau et al. |
| 7,378,362 | B2 | 5/2008 | Nixon et al. |
| 2005/0217950 | A1 | 10/2005 | Jolley, Jr. et al. |
| 2019/0072144 | A1 | 3/2019 | Bianco et al. |

FOREIGN PATENT DOCUMENTS

| | | |
|---|---|---|
| CN | 106478125 | 6/2019 |
| EP | 1481954 | 12/2004 |
| WO | 2017107735 | 6/2017 |

OTHER PUBLICATIONS

European Patent Office, European Search Report dated Mar. 10, 2021 in Application No. 20205456.5.

*Primary Examiner* — Camie S Thompson
(74) *Attorney, Agent, or Firm* — Snell & Wilmer L.L.P

(57) ABSTRACT

A method of manufacturing a ceramic matrix composite component includes pressure casting a fibrous preform with a slurry comprising boron carbide and densifying the fibrous preform using a liquid source of carbon. The method may include forming holes in the fibrous preform before pressure casting the fibrous preform with the slurry. The method may also include sintering the boron carbide after the pressure casting. In various embodiments, the sintering may be performed before the densifying.

19 Claims, 6 Drawing Sheets

METHOD OF MANUFACTURING CMC COMPONENTS USING BORON CARBIDE

FIELD

The present disclosure relates generally to ceramic matrix composite components, and more particularly to methods of fabricating ceramic matrix compose components, especially for brake components used in aircraft wheel and brake assemblies.

BACKGROUND

Carbon/carbon (C/C) composites are used in the aerospace industry for aircraft brake heat sink materials. Silicon carbide (SiC) based ceramic matrix composites (CMCs) have found use as brake materials in automotive and locomotive applications. These composites are typically produced using one or more of these three main methods: chemical vapor infiltration (CVI), melt infiltration (MI), and polymer impregnation and pyrolysis (PIP). However, each of these CMC fabrication methods has limitations. The processing time for both CVI and PIP, for example, can extend well over 100 hours. MI generated CMCs tend to contain residual silicon, which limits upper use temperature. Further, brake components fabricated using one or more of these methods often require inordinately high temperatures to achieve proper densification or fail to satisfy target thermal requirements (e.g., target high heat capacities). For example, the heat capacity of silicon carbide may not be sufficiently high for certain (e.g., aerospace) applications.

SUMMARY

In various embodiments, the present disclosure provides a method of manufacturing a ceramic matrix composite component. The method may include pressure casting a fibrous preform with a slurry comprising boron carbide and densifying the fibrous preform using a liquid source of carbon.

In various embodiments, pressure casting the fibrous preform with the slurry is performed before densifying the fibrous preform. The liquid source of carbon may include at least one of naphthalene, phthalonitrile, phenolic resin, and polyimide resin. In various embodiments, a slurry loading of boron carbide in the slurry is about 20%. In various embodiments, pressure casting the fibrous preform comprises mounting the fibrous preform to a submicron filter media in a pressure vessel.

The method may further include forming holes in the fibrous preform before pressure casting the fibrous preform with the slurry. The holes formed in the fibrous preform have a diameter of between about 0.01 inches and 0.10 inches, according to various embodiments. For example, the holes may have a diameter of about 0.06 inches. In various embodiments, after the pressure casting but before the densifying, a volume percentage of boron carbide in the fibrous preform is above 30%. In various embodiments, after the pressure casting but before the densifying, a volume percentage of boron carbide in the fibrous preform is above 40%.

The method may also include sintering the boron carbide after the pressure casting. Sintering the boron carbide comprises heat treating the fibrous preform at a temperature of between about 1650° C. and 2000° C. In various embodiments, sintering the boron carbide comprises heat treating the fibrous preform at a temperature of about 1900° C. The sintering may be performed before densifying the fibrous preform using the liquid source of carbon. In various embodiments, densifying the fibrous preform comprises heat treating the fibrous preform at a temperature of about 1600° C.

Also disclosed herein, according to various embodiments, is a method of manufacturing a ceramic matrix composite component. The method may include sintering boron carbide deposited on a fibrous preform and densifying the fibrous preform using a liquid source of carbon. Sintering the boron carbide may comprise heat treating the fibrous preform at a temperature of about 1900° C. Densifying the fibrous preform may comprise heat treating the fibrous preform at a temperature of about 1600° C. Sintering the boron carbide is performed before densifying the fibrous preform using the liquid source of carbon, according to various embodiments.

Also disclosed herein, according to various embodiments, is a method of manufacturing a ceramic matrix composite components. The method may include forming holes in a fibrous preform, after forming holes in the fibrous preform, pressure casting the fibrous preform with a slurry comprising boron carbide, after pressure casting the fibrous preform with the slurry, sintering the boron carbide deposited on the fibrous preform, and after sintering the boron carbide, densifying the fibrous preform using a liquid source of carbon.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
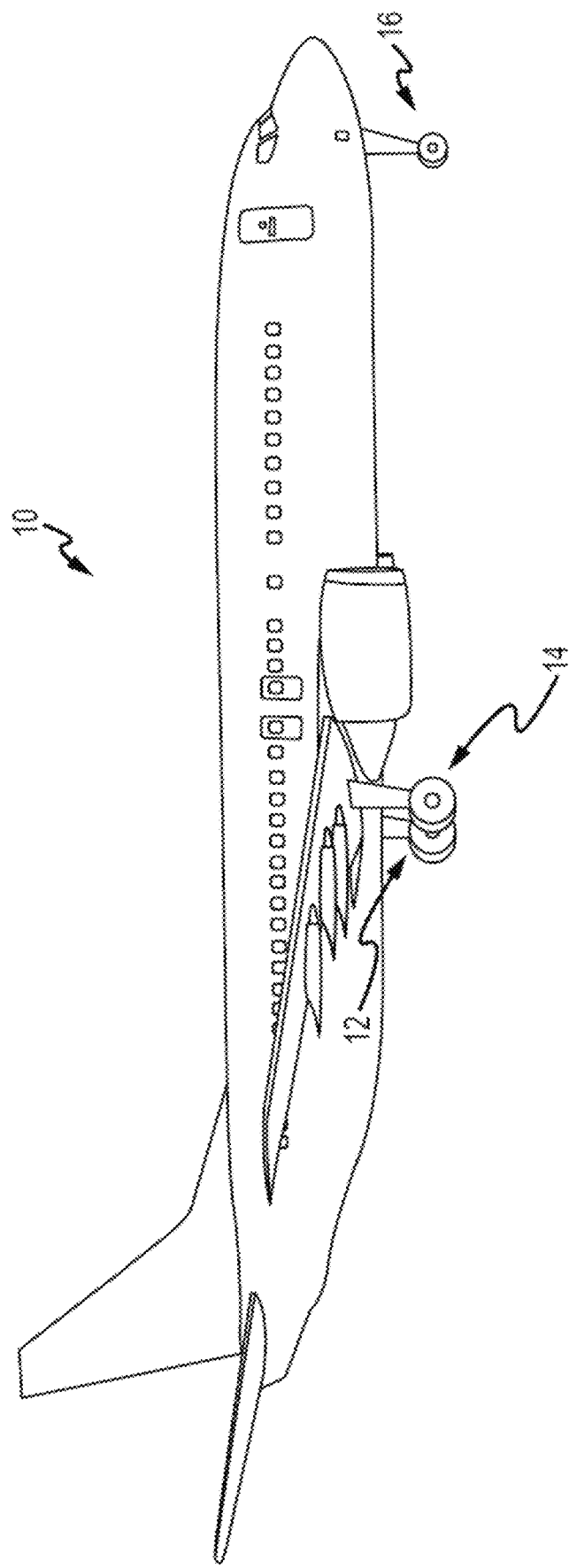
FIG. 1A illustrates an exemplary aircraft having a brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. As used herein, the term "about" refers to plus or minus 5% of the indicated value.

Ceramic matrix composite (CMC) materials generally exhibit higher heat capacity than carbon/carbon composites, and are thus well-suited for aerospace braking applications. Disclosed herein, according to various embodiments, are methods for manufacturing CMC components with boron carbide ($B_4C$). Though numerous details and examples are included herein pertaining to braking components of aircraft, the scope of the present disclosure is not necessarily limited to aerospace applications, as the methods described and disclosed herein may be utilized to fabricate CMC components for other industries. Additionally, the manufacturing methods described herein may be implemented with 2D preforms and 3D fibrous preforms (e.g., needled preforms that offer improved interlaminar shear strength).

Figure 1B:
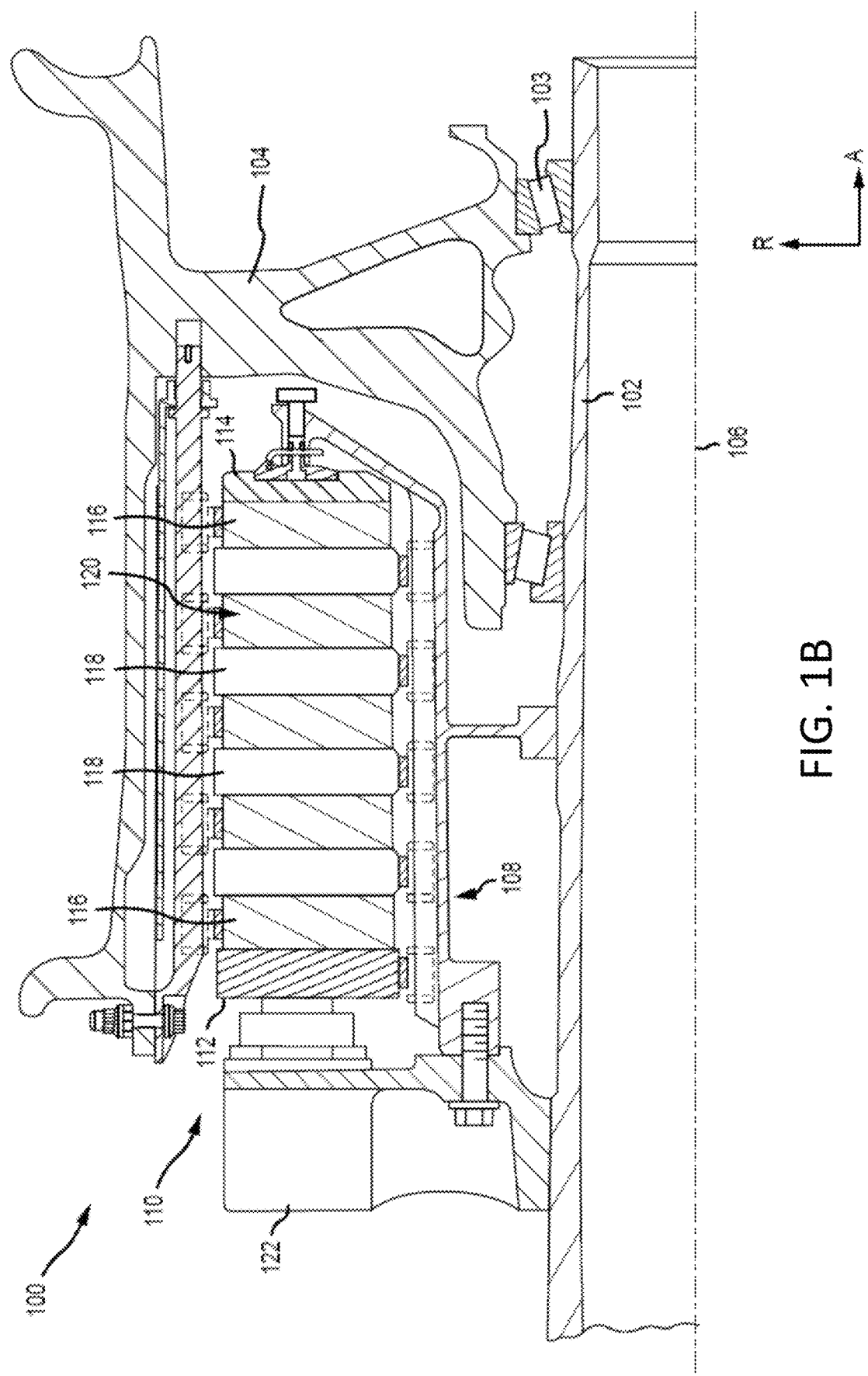
FIG. 1B illustrates a cross-sectional view of a brake assembly, in accordance with various embodiments.

Referring now to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations. Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism is mounted on an axle 102 for use with a wheel 104 disposed on and configured to rotate about the axle 102 via one or more bearing assemblies 103. A central axis 106 extends through the axle 102 and defines a center of rotation of the wheel 104. A torque plate barrel 108 (sometimes referred to as a torque tube or barrel or a torque plate) is aligned concentrically with the central axis 106, and the wheel 104 is rotatable relative to the torque plate barrel 108.

The brake mechanism 100 includes a piston assembly 110, a pressure plate 112 disposed adjacent the piston assembly 110, an end plate 114 positioned a distal location from the piston assembly 110, and a plurality of rotor disks 116 interleaved with a plurality of stator disks 118 positioned intermediate the pressure plate 112 and the end plate 114. The pressure plate 112, the plurality of rotor disks 116, the plurality of stator disks 118 and the end plate 114 together form a brake heat sink or brake stack 120. The pressure plate 112, the end plate 114 and the plurality of stator disks 118 are mounted to the torque plate barrel 108 and remain rotationally stationary relative to the axle 102. The plurality of rotor disks 116 is mounted to the wheel 104 and rotate with respect to each of the pressure plate 112, the end plate 114 and the plurality of stator disks 118.

An actuating mechanism for the brake mechanism 100 includes a plurality of piston assemblies, including the piston assembly 110, circumferentially spaced around a piston housing 122 (only one piston assembly is illustrated in FIG. 1B). Upon actuation, the plurality of piston assemblies affects a braking action by urging the pressure plate 112 and the plurality of stator disks 118 into frictional engagement with the plurality of rotor disks 116 and against the end plate 114. Through compression of the plurality of rotor disks 116 and the plurality of stator disks 118 between the pressure plate 112 and the end plate 114, the resulting frictional contact slows or stops or otherwise prevents rotation of the wheel 104. In various embodiments, the plurality of rotor disks 116 and the plurality of stator disks 118 are fabricated from various materials, such as, for example, ceramic matrix composite materials, that enable the brake disks to withstand and dissipate the heat generated during and following a braking action.

Referring now to FIGS. 2, 3, 4, and 5, methods of manufacturing CMC components are provided, according to various embodiments. The CMC components may be brake components, such as the plurality of rotor disks 116 or the plurality of stator disks 118 described above with reference to FIG. 1B, or to components thereof, such as, for example, wear liners attached to cores to form the disks. The methods disclosed herein, according to various embodiments, generally include processing steps that are performed on a fibrous preform. The fibrous preform may be prepared using bundles of carbon fiber filaments. The fibrous preform may have a desired shape and/or may comprise a wound fabric of fibers. In various embodiments, the fibrous preform may be cut from rolls of fabric prepared through weaving or through fiber lay-up and placement, such as, for example, cross-lapping of multiple layers of tow. In various embodiments, the tows are held in place through needling or stitching, such as, for example, Z-needling. Further, in various embodiments, the fibrous preform may be prepared from polyacrylonitrile (PAN) fibers or from continuous oxidized polyacrylonitrile (PAN) fibers (OPF fibers).

Figure 2:
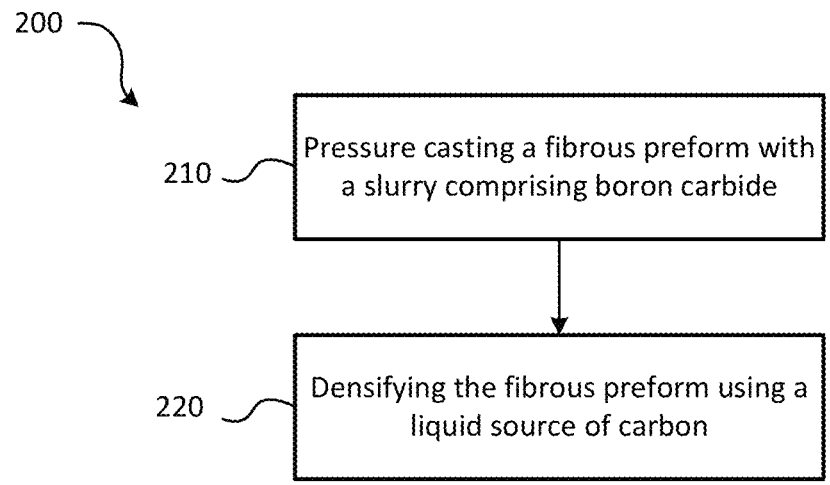
FIG. 2 is a schematic flow chart diagram of a method of manufacturing a ceramic matrix composite component, in accordance with various embodiments.

In various embodiments, and with reference to FIG. 2, a method 200 of manufacturing a CMC component is provided. The method 200 includes pressure casting a fibrous preform with a slurry comprising boron carbide at step 210 and densifying the fibrous preform using a liquid source of carbon at step 220. In step 210, a slurry containing boron carbide (B4C) powder is deposited to the fibrous preform. In various embodiments, the grain size of the boron carbide powder is less than about 1.5 microns to facilitate penetration within the fibrous preform. The slurry may include one or more dispersing and/or wetting agents. In various embodiments, the solid loading of boron carbide within the slurry is less than 20%. In various embodiments, the pressure casting process of step 210 includes applying the slurry to the preform at a pressure of between about 50 psi (340 kilopascal) and about 100 psi (690 kilopascal). Step 210 of the method 200 may include mounting the fibrous preform to a submicron filter media in a pressure vessel. After introducing the pressurized slurry to the fibrous preform, step 210 may include applying a vacuum to a downstream side of the submicron filter to remove remaining slurry liquid from the fibrous preform. In various embodiments, pressure casting the fibrous preform at step 210 is performed before densifying the fibrous preform at step 220. In various embodiments, after step 210 but before step 220, the fibrous preform may be dried.

In various embodiments, and with continued reference to FIG. 2, the densifying step 220 of method 200 includes densifying the fibrous preform using a liquid source of carbon. The liquid source of carbon may include naphthalene, phthalonitrile, phenolic resin, polyimide resin, and combinations thereof, among others. Step 220 may include utilizing a liquid that has low viscosity to facilitate infiltration into the small porosity of the submicron grains of boron carbide. The densifying step 220 may include multiple, sequential infiltrations. Step 220 may include performing a heat treatment at temperatures between about 800° C. and 1600° C. In various embodiments, each infiltration of the fibrous preform with the liquid carbon may be performed at a temperature of about 1600° C. Further, densifying the fibrous preform at step 220 may include machining the fibrous preform to open certain regions of the fibrous preform to infiltration by the liquid source of carbon. Additional details pertaining to the densifying step 220 are included below with reference to FIG. 4.

Figure 3:
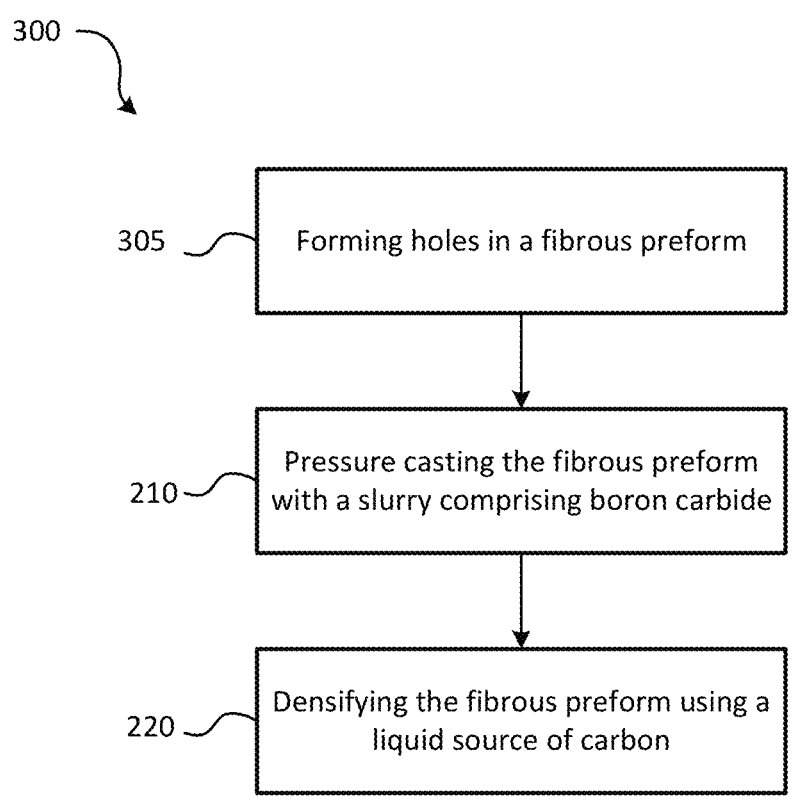
FIG. 3 is a schematic flow chart diagram of a method of manufacturing a ceramic matrix composite component, in accordance with various embodiments.

In various embodiments, and with reference to FIG. 3, a method 300 of manufacturing a CMC component is provided. The method 300 may include the aforementioned steps of pressure casting the fibrous preform with the slurry comprising boron carbide (e.g., step 210) and densifying the fibrous preform using a liquid source of carbon (e.g., step 220), but may also include forming holes in the fibrous preform at step 305. In various embodiments, step 305 is performed before the pressure casting at step 210. The holes formed in the fibrous preform may be drilled directly in the preform or may be formed using water jet cutting. The formation of the holes at step 305 may facilitate the incorporation of more boron carbide via the pressure casting step 210. Step 305 may also be utilized to customize the fibrous preform such that the final CMC component has desired mechanical and/or thermal properties.

In various embodiments, the diameter of the holes formed in the fibrous preform at step 305 is constant. In various embodiments, the diameter of the holes formed is between about 0.01 inches (0.025 centimeters) and 0.10 inches (0.25 centimeters). In various embodiments, the diameter of the holes is about 0.06 inches (0.15 centimeters). The shape and distribution pattern of the holes may be selected based on the end-use of the CMC component. For example, step 305 may include defining a series of holes that are aligned or offset relative to each other. The series of holes formed during step 305 may create a surface of the fibrous preform that has an open area between about 10% and about 35%. Said differently, the percentage of the surface of the fibrous preform that is defined by open holes is between about 10% and about 35%, according to various embodiments. In various embodiments, the formation of the holes allows for the subsequent pressure casting at step 210 to load the fibrous preform with boron carbide such that the volume percentage of boron carbide in the fibrous preform is above about 30% (without holes, the maximum volume percentage of boron carbide in the fibrous preform is less than 30%, even less than about 27%. In various embodiments, the holes may enable the volume percentage of boron carbide in the fibrous preform to be at or above 40%.

Figure 4:
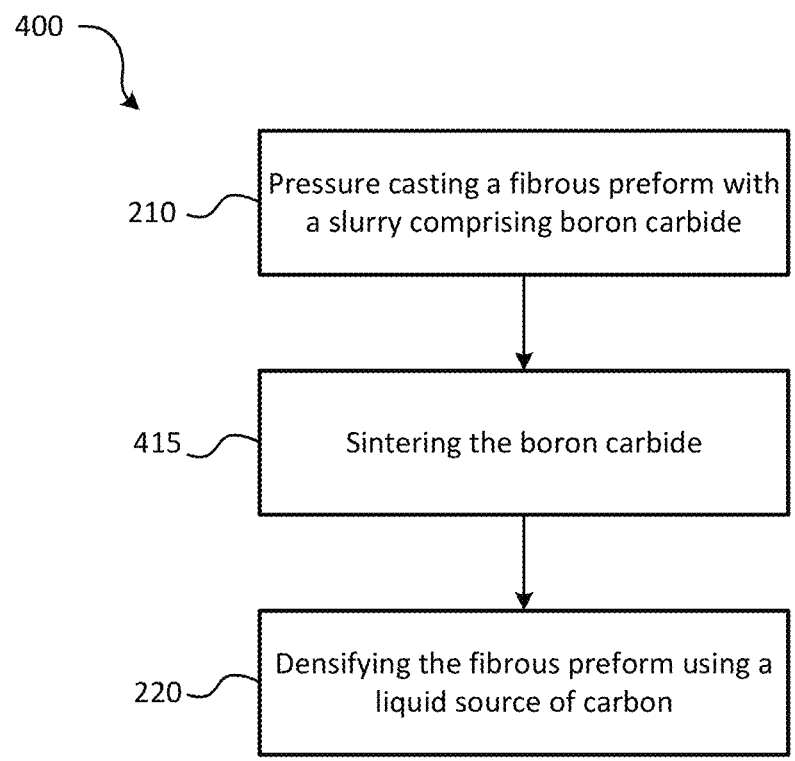
FIG. 4 is a schematic flow chart diagram of a method of manufacturing a ceramic matrix composite component, in accordance with various embodiments.

In various embodiments, and with reference to FIG. 4, a method 400 of manufacturing a CMC component is provided. The method 400 may include the aforementioned steps of pressure casting the fibrous preform with the slurry comprising boron carbide (e.g., step 210) and densifying the fibrous preform using a liquid source of carbon (e.g., step 220), but may also include sintering the boron carbide at step 415. In various embodiments, step 415 is performed after the pressure casting of step 210. In various embodiments, step 415 is also performed before the densifying step 220. Generally, step 415 performing heat treatments at elevated temperatures to induce sintering at the grain boundaries of the boron carbide, thereby reducing the volume/porosity of the boron carbide. Step 415 may provide greater mechanical strength to the CMC and may also facilitate infiltration of the liquid carbon at step 220. The degree of sintering may be performed before densification to tend to prevent or reduce stresses and/or cracking, which may occur if the sintering step 415 is performed too late in the manufacturing method 400. Said differently, by performing the sintering step 415 before repeated densification steps, the stress experienced by the fibrous preform during sintering is diminished because the fibrous preform has not yet had the level of porosity decreased during the densification steps.

In various embodiments, the sintering step 415 includes heat treating the fibrous preform at temperatures higher than the carbonization temperature of the densification step(s) 220. In various embodiments, step 415 includes heat treating the fibrous preform at a temperature of between about 1650° C. and 2000° C. In various embodiments, sintering the boron carbide at step 415 includes heat treating the fibrous preform at a temperature of about 1900° C.

Figure 5:
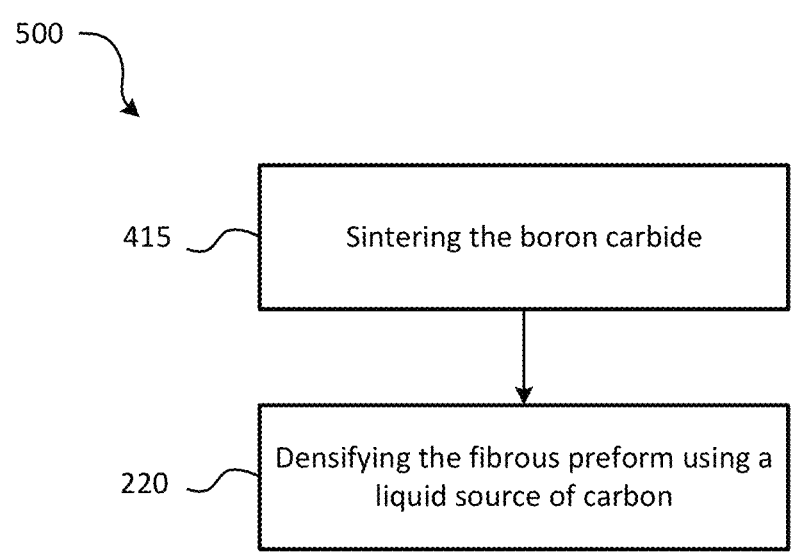
FIG. 5 is a schematic flow chart diagram of a method of manufacturing a ceramic matrix composite component, in accordance with various embodiments.

In various embodiments, and with reference to FIG. 5, a method 500 of manufacturing a CMC component is provided. The method 500 may include the aforementioned steps of sintering the boron carbide at step 415 and densifying the fibrous preform using the liquid source of carbon at step 220. That is, method 500 does not necessarily include the step of pressure casting the fibrous preform.

Figure 6:
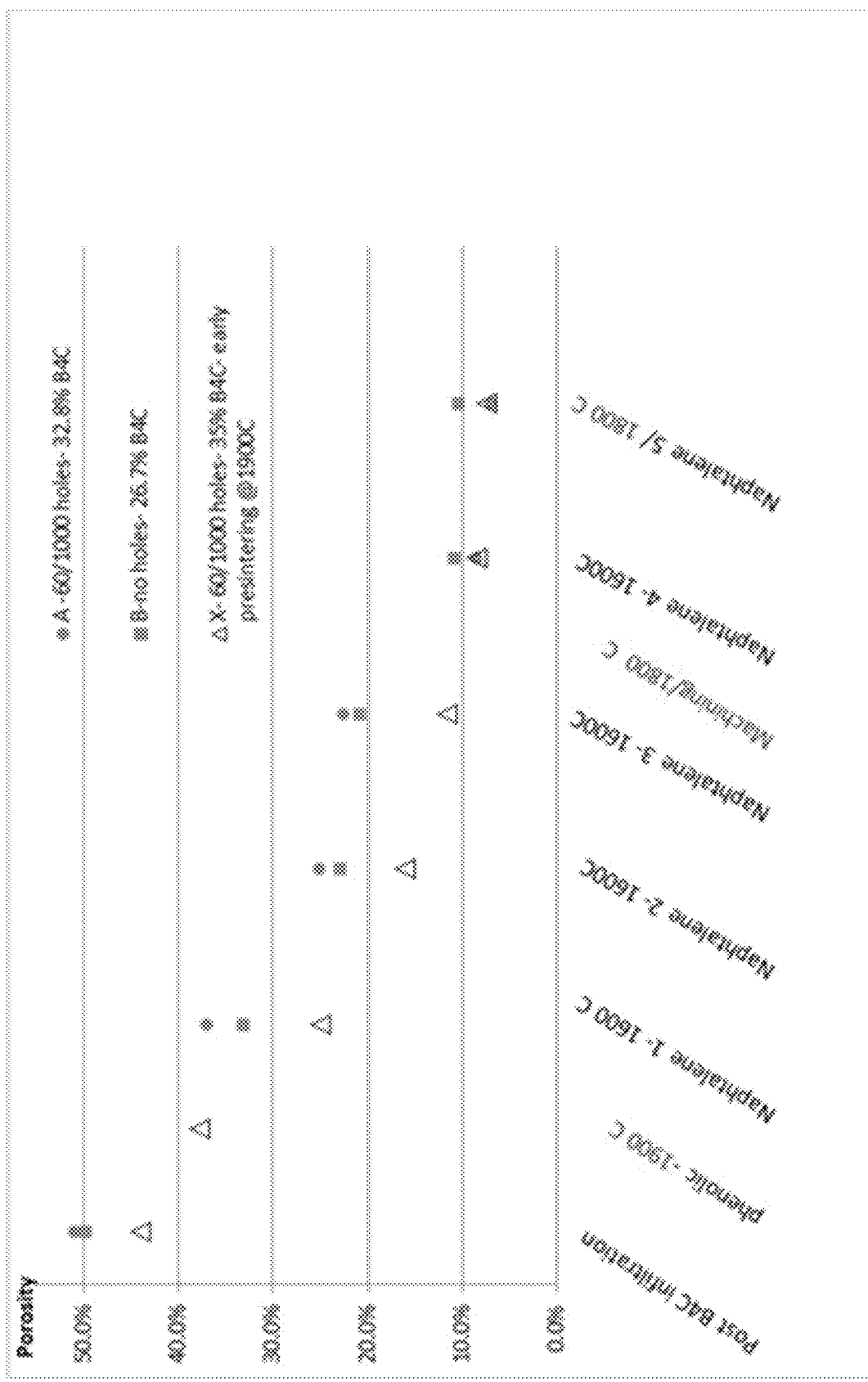
FIG. 6 is a graph showing porosity of a fibrous preform through various manufacturing processes, in accordance with various embodiments.

In various embodiments, and with reference to FIG. 6, a graph showing porosity of a fibrous preform through various manufacturing processes is provided. More specifically, the graph tracks porosity of the fibrous preform after step 210 described above. Three samples are shown in the graph: Sample A, Sample B, and Sample X. Samples A and X have holes formed via step 305, and Sample B does not have any holes. Additionally, Sample X has undergone the sintering step 415 described above after an initial/partial densification step (e.g., step 725, described in greater detail below with reference to FIG. 7), but before the later stage densification steps (220) are performed. More specifically, Sample X has undergone this 'pre-sintering' step for about 0.5 hours at 1900° C. As shown in FIG. 6, the porosity of Sample X changes from 44% post $B_4C$ infiltration via pressure casting (e.g., step 210) to 37.7% post pre-sintering. Sample X is further densified using naphthalene and additional heat treatments of 1600 C. Sample X exhibits a porosity close to 16% after three carbon source infiltrations (e.g., step 220). In contrast Samples A and B, not having experienced the early pre-sintering step 415, exhibit porosity of 21-22% after the same number of carbon source infiltrations. Sample X heat treatment at 1800 C does not show significant benefit in carbon pick-up in the subsequent naphthalene infiltration, according to various embodiments.

Figure 7:
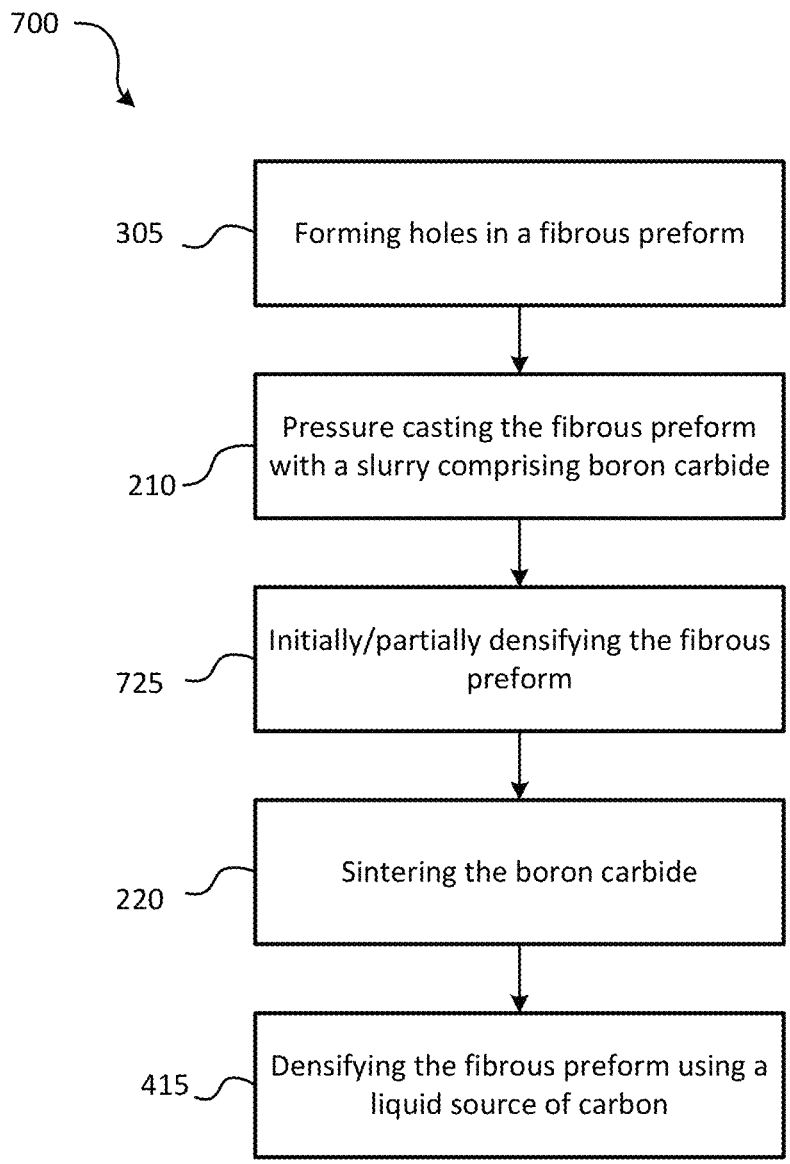
FIG. 7 is a schematic flow chart diagram of a method of manufacturing a ceramic matrix composite component, in accordance with various embodiments.

In various embodiments, sample A, which has similar holes as sample X, was exposed to three liquid carbon densification steps prior to conducting the pre-sintering step at 1800 C for 0.5 hour. A substantial drop in porosity was observed following the fourth carbon source densification step. Following a fifth liquid carbon densification and a second pre-sintering step at 1800 C the highly loaded $B_4C$ sample A showed multiple cracks. Sample X and the lower $B_4C$ solid loading sample B after the last pre-sintering step were free of cracks. Accordingly, performing the first pre-sintering step after $B_4C$ incorporation via pressure casting but after an initial/partial carbon source densification may provide an especially beneficial result, according to various embodiments. Said differently, FIG. 7 shows various steps of a method 700 of manufacturing a ceramic matrix composite component, with steps 305*m* 210, 220, and 415 described above. Method 700 may include the earlier mentioned step of performing an initial/partial densification step at 725 before sintering the boron carbide at step 220. That is, one or more initial/partial densification steps (725) may be performed after the pressure casting 210 but before sintering (step 220). After sintering, the preform densification may be completed (step 415).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a ceramic matrix composite component, the method comprising:
   pressure casting a fibrous preform with a slurry comprising boron carbide;
   sintering the boron carbide; and
   densifying the fibrous preform using a liquid source of carbon.

2. The method of claim 1, wherein pressure casting the fibrous preform with the slurry is performed before densifying the fibrous preform.

3. The method of claim 1, wherein the liquid source of carbon comprises at least one of naphthalene, phthalonitrile, phenolic resin, and polyimide resin.

4. The method of claim 1, wherein a slurry loading of boron carbide in the slurry is about 20%.

5. The method of claim 1, wherein pressure casting the fibrous preform comprises mounting the fibrous preform to a submicron filter media in a pressure vessel.

6. The method of claim 1, further comprising forming holes in the fibrous preform before pressure casting the fibrous preform with the slurry.

7. The method of claim 6, wherein the holes formed in the fibrous preform have a diameter of between about 0.01 inches and 0.10 inches.

8. The method of claim 6, wherein the holes formed in the fibrous preform have a diameter of about 0.06 inches.

9. The method of claim 6, wherein after the pressure casting but before the densifying, a volume percentage of boron carbide in the fibrous preform is above 30%.

10. The method of claim 6, wherein after the pressure casting but before the densifying, a volume percentage of boron carbide in the fibrous preform is above 40%.

11. The method of claim 1, wherein sintering the boron carbide comprises heat treating the fibrous preform at a temperature of between about 1650° C. and 2000° C.

12. The method of claim 1, wherein sintering the boron carbide comprises heat treating the fibrous preform at a temperature of about 1900° C.

13. The method of claim 1, wherein sintering the boron carbide is performed after an initial/partial densifying step but before completing densification of the fibrous preform using the liquid source of carbon.

14. The method of claim 1, wherein densifying the fibrous preform comprises heat treating the fibrous preform at a temperature of about 1600° C.

15. A method of manufacturing a ceramic matrix composite component, the method comprising:
   sintering boron carbide deposited on a fibrous preform; and
   densifying the fibrous preform using a liquid source of carbon.

16. The method of claim 15, wherein sintering the boron carbide comprises heat treating the fibrous preform at a temperature of about 1900° C.

17. The method of claim 16, wherein densifying the fibrous preform comprises heat treating the fibrous preform at a temperature of about 1600° C.

18. The method of claim 15, wherein sintering the boron carbide is performed before densifying the fibrous preform using the liquid source of carbon.

19. A method of manufacturing a ceramic matrix composite component, the method comprising:
   forming holes in a fibrous preform;
   after forming holes in the fibrous preform, pressure casting the fibrous preform with a slurry comprising boron carbide;
   after pressure casting the fibrous preform with the slurry, sintering the boron carbide deposited on the fibrous preform; and
   after sintering the boron carbide, densifying the fibrous preform using a liquid source of carbon.

\* \* \* \* \*